United States Patent
Rajan et al.

(10) Patent No.: US 7,646,729 B2
(45) Date of Patent: Jan. 12, 2010

(54) METHOD AND APPARATUS FOR DETERMINATION OF NETWORK TOPOLOGY

(75) Inventors: Govinda N. Rajan, Hilversum (NL); Willem van Willigenburg, Hilversum (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 692 days.

(21) Appl. No.: 10/870,217

(22) Filed: Jun. 17, 2004

(65) Prior Publication Data

US 2006/0031445 A1     Feb. 9, 2006

(51) Int. Cl.
*H04L 12/28* (2006.01)
*G06F 15/173* (2006.01)

(52) U.S. Cl. .................. 370/254; 370/400; 709/224
(58) Field of Classification Search .......... 370/254
See application file for complete search history.

(56) References Cited

U.S. PATENT DOCUMENTS

| | | | |
|---|---|---|---|
| 5,251,205 A * | 10/1993 | Callon et al. | 370/392 |
| 5,850,397 A * | 12/1998 | Raab et al. | 370/392 |
| 6,205,122 B1 * | 3/2001 | Sharon et al. | 370/254 |
| 6,286,038 B1 * | 9/2001 | Reichmeyer et al. | 709/220 |
| 6,421,676 B1 * | 7/2002 | Krishnamurthy et al. | 707/102 |
| 7,054,951 B1 * | 5/2006 | Kao et al. | 709/242 |
| 7,263,552 B2 * | 8/2007 | Govindarajan et al. | 709/224 |
| 7,420,929 B1 * | 9/2008 | Mackie | 370/252 |
| 2002/0158897 A1 * | 10/2002 | Besaw et al. | 345/734 |
| 2003/0046427 A1 * | 3/2003 | Goringe et al. | 709/242 |
| 2005/0083854 A1 * | 4/2005 | Nagarajrao et al. | 370/254 |

OTHER PUBLICATIONS

Smart Draw Home Page, © 2004; http://www.smartdraw.com/index.htm.
Bradley Huffaker, Evi Nemeth, K Claffy, Otter: A general-purpose network visualization tool, Copyright ISOC Inet 99; http://www.caida.org/tools/visualization/otter/paper/.
Robert Graham, Sniffing (network wiretap, sniffer) FAQ Version 0.3.3, Sep. 14, 2000, Copyright 1998-2000; http://www.robertgram.com/pubs/sniffing-faq.html.

* cited by examiner

*Primary Examiner*—Melanie Jagannathan
(74) *Attorney, Agent, or Firm*—Wall & Tong, LLP

(57) ABSTRACT

A method and apparatus for determining network topology includes adapting a single sniffer to collect information from nodes associated with at least two selected areas of the network and determining a topology of at least a portion of the network using the collected information.

32 Claims, 3 Drawing Sheets

METHOD AND APPARATUS FOR DETERMINATION OF NETWORK TOPOLOGY

FIELD OF INVENTION

This invention relates to the field of communications networks and, more specifically, to determining the configuration or topology of such networks.

BACKGROUND OF INVENTION

Data Communications Networks (DCN's) are separated into different areas, each area containing a certain number of nodes. Each node in a particular area has knowledge of neighboring nodes. That is, information about each node is readily available to other nodes in the same area so that nodes in the same area can easily exchange information. As DCN's grow larger and more complex, the need for determining the configuration (or topology) of the DCN and verifying the connectivity of links between nodes also increases. This information is particularly important in "management" networks that overlay or manage lower level networks that are responsible for the actual transmission of data.

Determining DCN configurations and identifying connectivity faults in the network are necessary maintenance tasks. Traditionally, this determination is performed by executing a "sniffing" operation at each area. The term sniffing pertains to monitoring and collecting information that the various nodes have about each other and is well known in the art. An example of the principles and procedures for sniffing may be found in "Sniffing (network wiretap, sniffer) FAQ" Version 0.3.3 available from Sep. 14, 2000 at www.robertgraham.com/pubs/sniffing-faq.html herein incorporated by reference in its entirety. Sniffing can be done either directly (by physically going to each area location and performing the required operations) or indirectly (by activating a remote sniffer that is connected to and dedicated for each particular area). Once the sniffing operation is completed, an analysis is performed on all of the "sniffed" information to determine the topology. The complexity of topology determination is compounded as more areas are added to the network. Specifically, an increase in areas results in an increase in time consuming remote monitoring and collection procedures. Additionally, network equipment costs increase as a sniffer must be located at each new area to perform the required sniffing operation.

SUMMARY OF THE INVENTION

The disadvantages heretofore associated with the prior art are overcome by a novel method and apparatus for determining a network topology with a single sniffer. The method includes the steps of adapting a single sniffer to collect information from nodes associated with at least two selected areas of the network and determining a topology of at least a portion of the network using the collected information. The step of adapting a single sniffer to collect information includes, in one embodiment, connecting the sniffer to a central location of the network. The sniffer may be part of an existing network management system of the network or be a stand-alone device connected independently to the central location of the network.

The step of adapting the single sniffer additionally includes, in one embodiment, configuring the centrally connected network sniffer as a partitioned designated node of a selected area. Information is received by the sniffer in a manner that includes collecting information about nodes in a selected area based upon an existing network protocol. In one embodiment of the invention, the existing network protocol is part of ISO-IEC 10589:2001 and the information may include link state messages.

The step of composing the topology may include collecting information about the first area and calculating the topology according to the first area and then subsequently receiving information about a second or more areas and recalculating the topology accordingly. Alternately, the step of composing the topology map may include receiving information from all nodes of all areas in the network and performing a single topology map calculation therefrom.

The invention also includes an apparatus in the form of a computer readable medium containing instructions for operating a computer in accordance with the method steps presented. The invention also includes a communications network having improved topology determination means comprising an inner nodal area, one or more outer nodal areas connected to the inner nodal area and means for detecting topology forming information about all nodes in the inner and outer nodal areas from a central location in the communications network. The means for detecting the topology forming information is a sniffer connected to the inner nodal area.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention presents the concept that determination of network topologies in data communication networks (DCN's) can be made by the unexpected use and exploitation of data that is available in such networks for reasons other than topology determination. Although the invention is discussed and presented within the context of an Intermediate System-Intermediate System (IS-IS) routing information exchange protocol network operating in accordance with said protocol for providing connection lists-mode network service, it is noted that the invention is also applicable to other types of data communication networks. An example of an IS-IS communication system and protocols for managing same may be found in ISO-IEC 10589:2001 herein incorporated by reference in its entirety.

Figure 1:
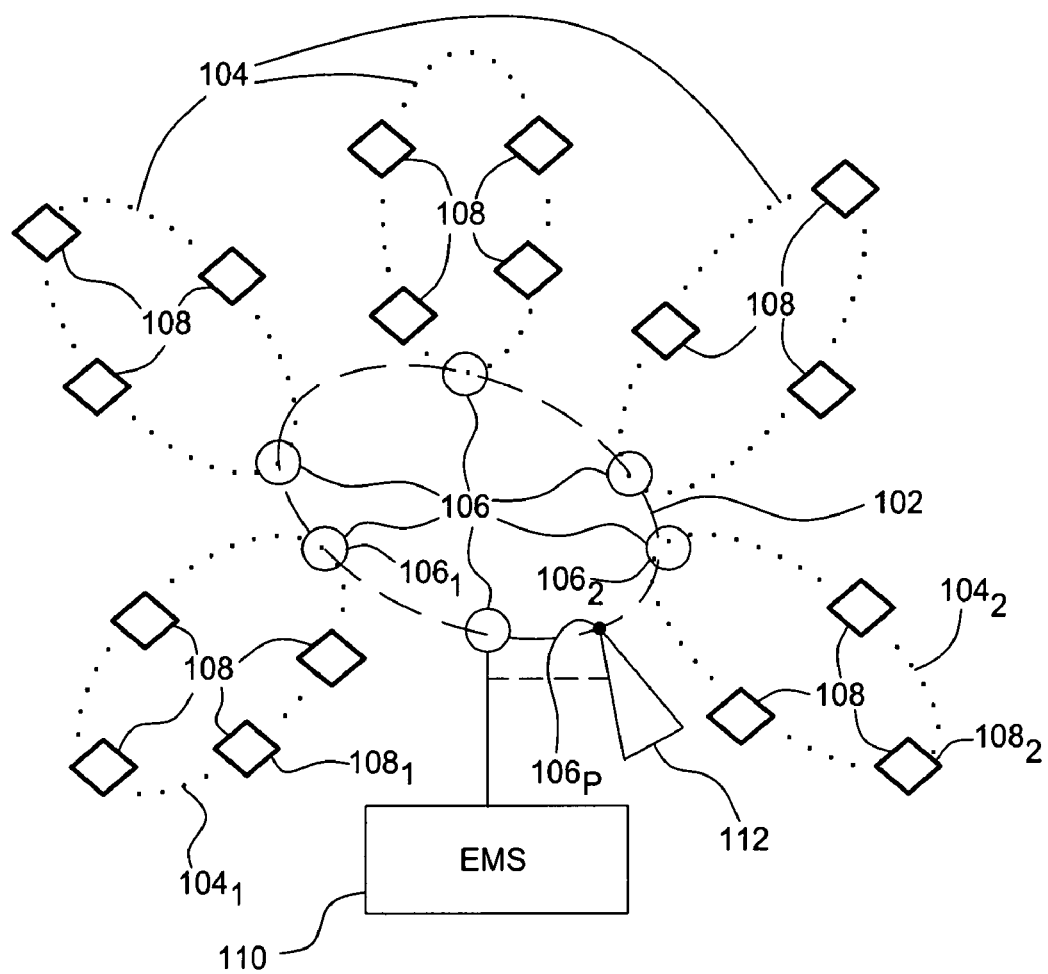
FIG. 1 depicts a schematic view of a network in accordance with an embodiment of the subject invention.

FIG. 1 depicts a network 100 (i.e., a DCN) operating in accordance with an embodiment of the subject invention. A DCN network 100 of FIG. 1 comprises a plurality (illustratively 5) of L1 areas and, illustratively, one L2 area. Each L1 area has a plurality of L1 nodes and one L2 node. All the L2 nodes are connected to each other and to an element management system (EMS). Individual nodes or network elements are managed via the EMS using connectivity in the L2 area and the respective L1 areas. All nodes in one level send link status information only to the nodes in that level and in that particular area. That is, all nodes and one L1 area send link status messages only to the other nodes in that area. The L2 node in an L1 area is also an L1 node for that L1 area. L2 nodes in turn exchange link state messages only for the L2 area. Thus, if one L1 node in an L1 area sends a message to another L1 node in another L1 area, the message is sent to the respective L2 node, which routes message to another L2 node associated with the target L1 area. The L2 node at the target L1 area then routes the message to the destination L1 node.

The network 100 comprises an inner ring area 102 having a plurality of inner ring (L2) nodes 106. One or more outer ring areas 104 are connected to the inner ring area 102 via the inner ring nodes 106. Additionally, each of the outer ring areas 104 comprises one or more individual (L1) nodes 108 through which network users gain access to the network 100 and exchange information with other areas. Each of the nodes 106 and 108 (and the network 100 in general) is managed by an element management system (EMS) 110. The EMS 110 is connected to the network 100 via one of the inner ring nodes 106. Proper operation of network 100 requires that each of the nodes 106 and 108 have appropriate connectivity to the EMS 110. In the specific example of a data communications network, DCN connectivity is one such example of the required network environment. Determination of the configuration or topology of the network 100 is accomplished by analysis of link state messages (LSPs) that move back and forth between the nodes 106 and 108 respectively within their area. Once a topology is determined, the network can monitor such LSPs to determine if there are communication faults in the network 100.

All nodes in one area send link status information only to the nodes in that area, i.e., all nodes in a first outer ring area $104_1$, send LSPs only to the other nodes in that area. A first inner ring node $106_1$ in the first outer ring area $104_1$ is also considered an outer ring node for that first outer ring area $104_1$. Additionally, inner ring nodes 106 in turn exchange LSPs only for the inner ring area 102. Therefore, if a first outer ring node (e.g., $108_1$) in a first outer ring area $104_1$ sends a message to a second outer ring node $108_2$ in a second outer ring area $104_2$, the message is first sent to the respective inner ring node (e.g., first inner ring node $106_1$). This inner ring node then routes the message to a second inner ring node $106_2$ at the target outer ring area $104_2$. The second inner ring node $106_2$ at the target outer ring area $104_2$ then routes the message to the second outer ring node $108_2$. Accordingly, routing of messages in the manner discussed provides a way of tracking the status of the network and monitoring for a fault at one or more locations therein.

The network 100 further comprises a central sniffing device 112 that is connected centrally to the network 100 via to the inner ring 102. In one embodiment of the invention, the sniffer is a specific component of the EMS 110 (shown by a broken line connection between the EMS 110 and the sniffer 112). In a second embodiment, the sniffer 112 is a stand-alone device that is independently connected to the network 100. The central sniffer 112 is a single device that has the ability to be configured as a member of various different outer ring areas 104 so as to essentially become a part of these outer ring areas at the discretion of the EMS 110 or network operator desiring to perform the topology determination of the subject invention. Such configuration is possible by virtue of the protocols used to manage the network as described in greater detail below.

Figure 1A:
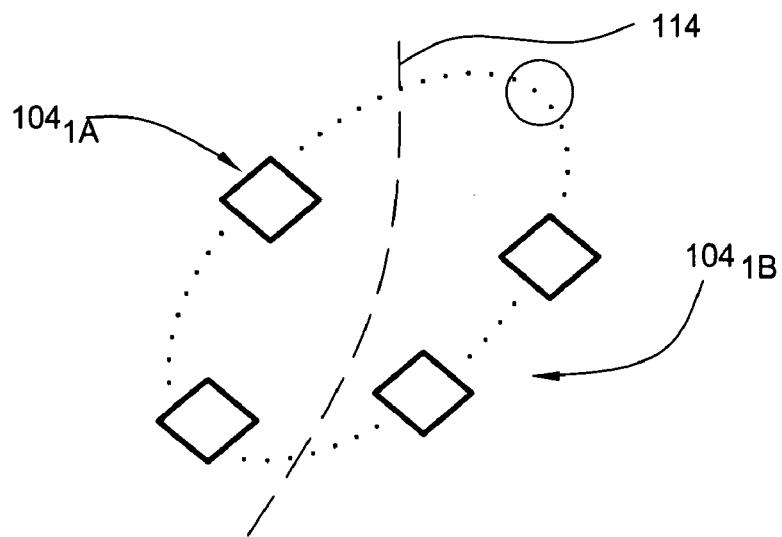
FIG. 1A depicts a detailed schematic view of a portion of the network seen in FIG. 1.

The central sniffer 112 exploits the Repair of Partition Areas feature as explained in ISO/IEC 10589:2001. Partitioning occurs when some portion of the network 100 (or an area 104/102 of the network) suffers a fault. As a result of the fault, the area is divided or partitioned into two subareas. An example of this phenomenon is depicted in FIG. 1A. Specifically, (denoted by dotted vertical line 114) first outer ring area $104_1$ is partitioned into subareas $104_{1A}$ and $104_{1B}$ as a result of a DCN fault. The repair feature presented in ISO/IEC 10589: 2001 provides the necessary information and instructions for repairing the fault so that the partitioned area is made whole again. However, it has been realized that the information provided to the network (e.g., the EMS 110 in the network) during the partition repair operation provides sufficient information for determining the topology of the network. The central sniffer 112 takes advantage of this new found information in the following manner. Assuming that a certain outer ring area has to be sniffed (e.g., first outer ring area $104_1$), the sniffer 112 is configured as a partition designated inner ring node $106_p$ (e.g., another node comparable to first inner ring node $106_1$) of that particular outer ring area (e.g., $104_1$). This partition designated node $106_p$ searches for a partition designated inner ring node in the original outer ring area. Then it creates a virtual outer ring adjacency with the partition designated inner ring node, thus it also receives all LSPs for the outer ring area to be sniffed. In one example of the invention, the searched-for partition designated inner ring is inner node $106_1$ of system 100.

When all the LSPs have been received or after a time-out, the sniffer 112 is then configured to become a partition designated inner ring node of the next outer ring area to be sniffed (e.g., second outer ring area $104_2$) and the process is repeated. Hence, by reconfiguring one sniffer to act as a designated inner ring node for every outer ring area, the required information for determining topology can be obtained. By virtue of this improvement, it has been realized by the inventors that physical installation of sniffers in every outer ring area 104 may be avoided. Since only one sniffer 112 is needed to map the complete topology of a network, fewer resources are needed and the attendant network cost are reduced.

Figure 2:
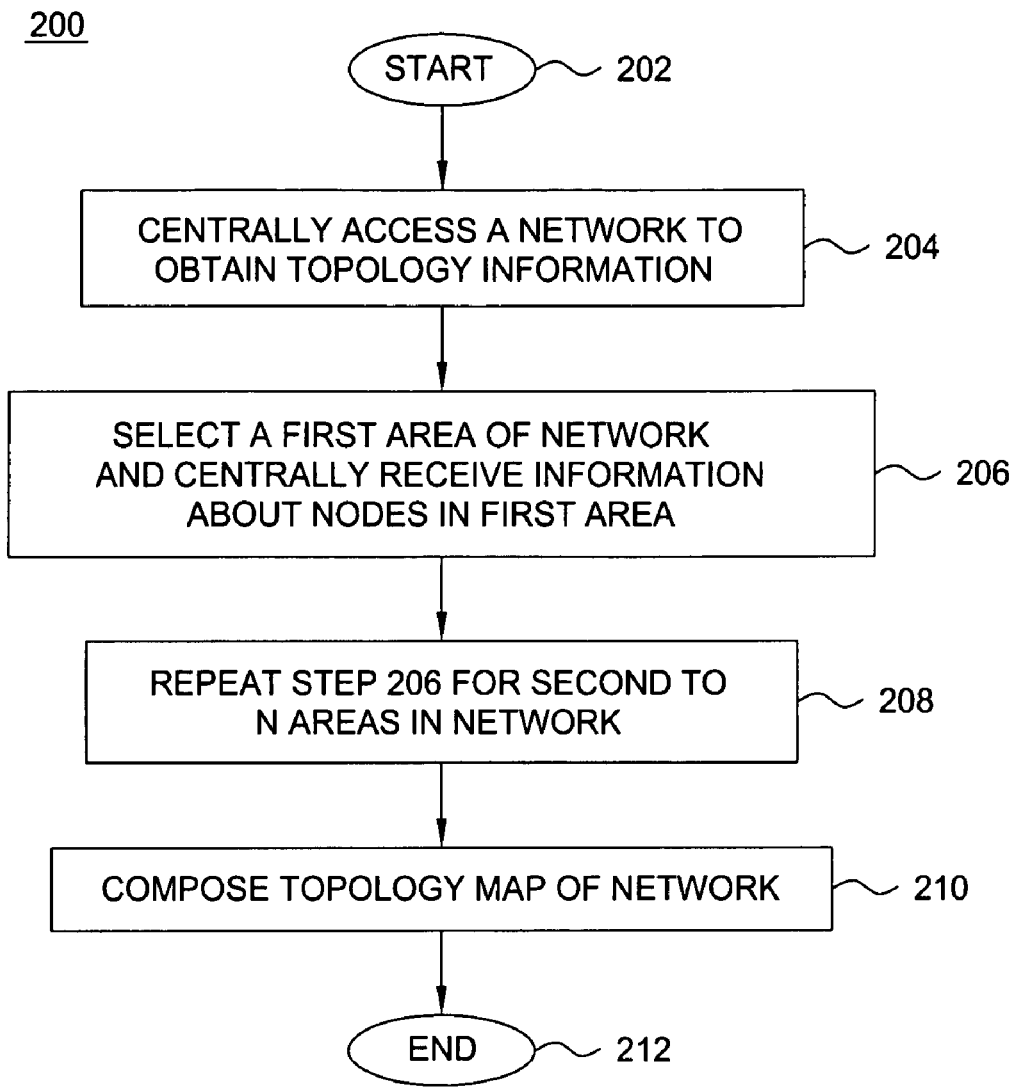
FIG. 2 depicts a series of method steps for determining a network topology in accordance with an embodiment of the subject invention.

FIG. 2 depicts a series of method steps 200 in accordance with a method of the subject invention for determining topology of communication networks. Specifically, the method starts at step 202 and proceeds to step 204 where a network (such as network 100) is centrally accessed for the purposes of obtaining topology information. In one embodiment of the invention, this central access is performed via a single sniffer (such as sniffer 112 as seen in network 100) that has the ability to function as an inner ring node 106 in at least two areas of the network 100. The functionality of the sniffer 112 as an inner ring node 106 is accomplished by configuring the sniffer as a partition designated inner ring node in accordance with the repair of partition feature of ISO/IEC 10589:2001. The method then proceeds to step 206 where a first area (e.g., area $104_1$) of a network (such as network 100) is selected for sniffing and information about nodes in the first area are centrally received by the network. That is, since the sniffer 112 functions as an inner ring node of the first area, it has access to all of the LSPs that are moving through first area $104_1$ during the partition repair operation. Accordingly, information about all the nodes in the first area is collected by the central sniffer 112.

At step 208, and after having the first area appropriately sniffed and the information collected, step 206 is repeated for a second area (e.g., outer ring area $104_2$ of network 100) and the partition designation configuration of the sniffer is performed with respect to this second area $104_2$. Information is then appropriately sniffed and centrally received by the central sniffer 112 to obtain all necessary information about nodes in the second area. Accordingly, this process is repeated for any number of N areas in network 100 until all such outer ring areas are appropriately polled. That is, a sniffer 112 is appropriately configured as a partition designated inner ring node for such N areas, the partition repair feature executed and the information centrally received by sniffer 112.

The method then proceeds to step 210 where upon collection of all the information from all of the N outer ring areas in the network, a topology map of the network is composed. In one example of the invention, the composition process is accomplished by known techniques by those skilled in the art for creating topology maps. Examples of these operations may be found in the Standard SmartDraw software package manufactured and sold by SmartDraw.com of San Diego, Calif. and as seen on their website at www.smartdraw.com and in "Otter: A general-purpose network visualization tool" by Huffaker, Nemeth and Claffy herein incorporated by reference. In a first embodiment of the invention, step 210 may be practiced in a "round robin" type of procedure. That is, as each new outer ring area is partition repaired and the information about each of the nodes in such area received, a new topology composition process is executed to essentially build the network on a per area basis. As such, the topology map is constructed in real time. In a second embodiment of the invention, all information about each of the nodes in all the areas is collected and stored in a local memory in the network (e.g., a memory found either at the central sniffer 112 or the element management system 110) and a single topology composition step calculation is performed to generate the entire map at one time. The method ends at step 212.

Figure 3:
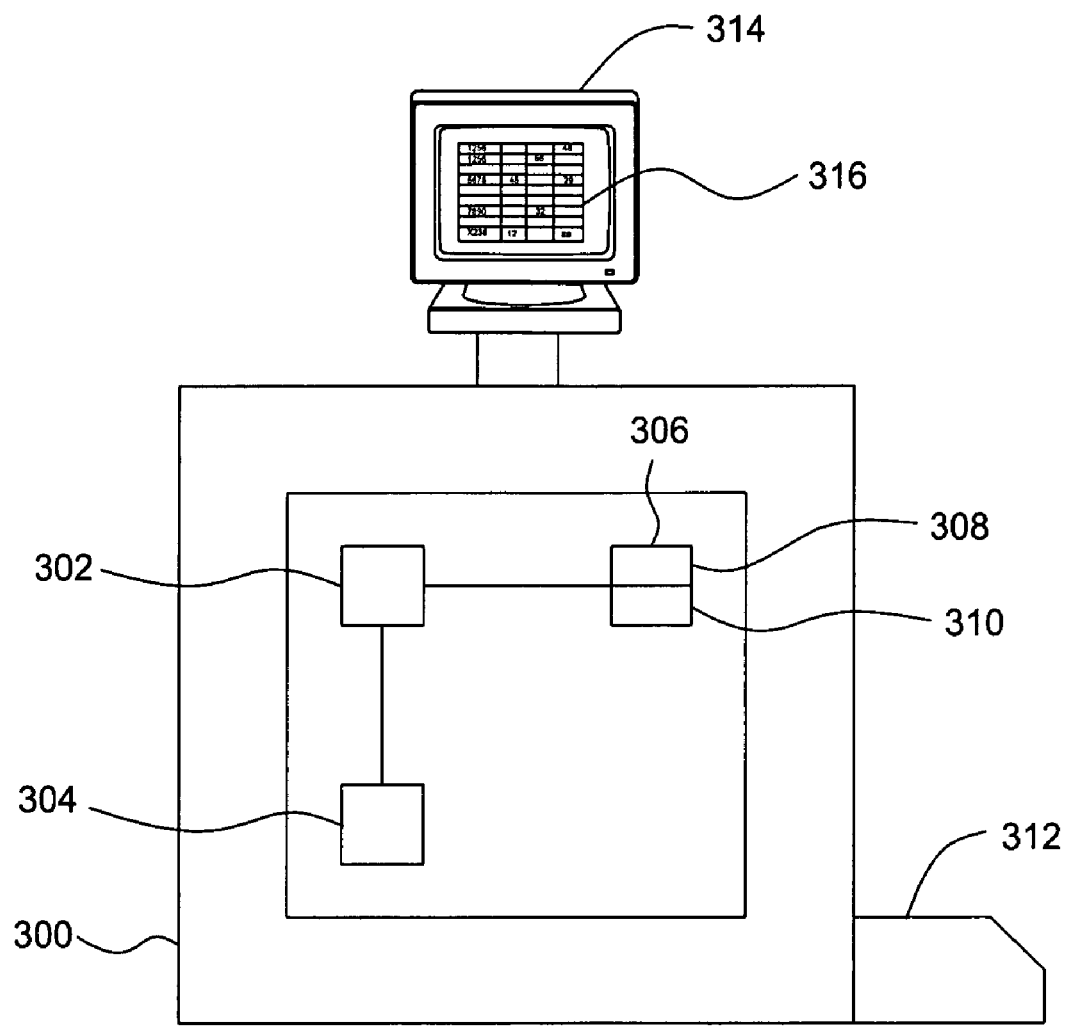
FIG. 3 depicts an apparatus for determining network topology in accordance with an embodiment of the subject invention.

An apparatus in accordance with one embodiment of the subject invention is presented in FIG. 3. Specifically, FIG. 3 depicts a computer 300 (personal computer, networked workstation, network server or the like). The computer 300 includes at least one central processing unit (CPU) 302, support circuits 304, and memory 306. The CPU 302 may comprise one or more conventionally available microprocessors. The support circuits 304 are well known circuits that comprise power supplies, clocks, input/output interface circuitry and the like. Memory 306 comprises various types of computer readable medium including, but not limited to random access memory, read only memory, removable disk memory, flash memory and various combinations of these types of memory. The memory 306 is sometimes referred to as main memory and may in part be used as cache memory or buffer memory. The memory 306 stores various software packages 308-310 that perform operations essential to the computer 300 and/or interconnected workstations, servers and the like if operating in a network environment. When running a particular software package or program 308-310, the computer 300 becomes a special purpose machine for determining network topology in accordance with information received from a centrally disposed sniffing device in accordance with the subject invention. More specifically, the computer 300 becomes a special purpose machine for determining network topologies in accordance with method steps 200 of FIG. 2 and as described above.

The computer may contain one or more interfaces 312 selected from the group consisting of a keyboard, mouse, touch screen, keypad, voice-activated interface for entering data and/or executing management command functions in the network including but not limited to the configuration of the sniffer as a partition designated node as described above. Such information can be displayed in a network status display 316 on display device 314.

The above-described invention has been primarily discussed within the context of determining the topology of an entire network. However, in various embodiments of the invention only portions of a network necessary to achieve some purpose (e.g., fault isolation and the like) may be determined. For example, if a particular area is experiencing fault conditions, that area and other areas proximate to particular area may be sniffed to determine thereby the topology of the "region" in which full conditions exist.

In one embodiment of the invention, a sniffer device is centrally located in the network. In other embodiments, the sniffer device may be located in a non-central location. For example, where an existing network includes a sniffing device and that network is connected to other networks, the sniffing device associated with the existing network may be used to retrieve information from the newly connected networks to help establish thereby the topology of the resulting network.

Although various embodiments that incorporate the teachings of the present invention have been shown and described in detail herein, those skilled in the art can readily devise many other varied embodiments that still incorporate these teachings.

What is claimed is:

1. A method for managing a communications network, the method comprising:
adapting a sniffer to collect information from nodes of a first outer nodal area of the communications network, wherein the communications network comprises:
an inner nodal area; and
a plurality of outer nodal areas connected to the inner nodal area via respective nodes of the inner nodal area,
each outer nodal area comprising a plurality of nodes, each of the plurality of nodes configured to send link status messages only to other nodes of the outer nodal area,
wherein the adapting comprises:
configuring the sniffer as a partition designated inner-nodal-area node of the first outer nodal area;
adapting the sniffer to collect information from nodes of a second outer nodal area of the communications network by configuring the sniffer as a partition designated inner-nodal-area node of the second outer nodal area; and
determining a topology of at least a portion of the communications network using the collected information, the portion of the communications network comprising the first and second outer nodal areas.

2. The method of claim 1, further comprising:
connecting the sniffer to a central location of the communications network.

3. The method of claim 1, wherein the sniffer is a part of an existing network management system of the communications network.

4. The method of claim 1, wherein the sniffer is a stand-alone device connected independently to a central location of the communications network.

5. The method of claim 1, further comprising:
for each remaining outer nodal area of the plurality of outer nodal areas:
adapting the sniffer to collect information from nodes of the remaining outer nodal area by configuring the sniffer as a partition designated inner-nodal-area node of the remaining outer nodal area.

6. The method of claim 5, further comprising:
determining a topology of the entire communications network using the collected information from each of the plurality of outer nodal areas.

7. The method of claim 1, wherein the collected information comprises link state messages sent by nodes of the first and second outer nodal areas.

8. The method of claim 1, wherein the collected information is based upon an existing network protocol.

9. The method of claim 8, wherein the existing network protocol is part of ISO-IEC 10589:2001.

10. The method of claim 1, wherein the determining the topology further comprises:
 collecting information about the first inner nodal area;
 calculating the topology according to the first inner nodal area;
 subsequently receiving information about the second inner nodal area; and
 recalculating the topology based upon the second inner nodal area.

11. The method of claim 1, wherein the determining the topology further comprises:
 receiving information from all nodes of all areas in the communications network; and
 performing a single topology calculation.

12. The method of claim 1, wherein each node of the inner nodal area that connects a respective outer nodal area to the inner nodal area is a two-level node such that, at one level, the node functions as a member of the inner nodal area and, at another level, the node functions as a member of the respective outer nodal area.

13. A computer readable storage medium containing a program which, when executed, performs an operation for managing a communications network, the operation comprising:
 adapting a sniffer to collect information from nodes of a first outer nodal area of the communications network, wherein the communications network comprises:
  an inner nodal area; and
  a plurality of outer nodal areas connected to the inner nodal area via respective nodes of the inner nodal area,
  each outer nodal area comprising a plurality of nodes, each of the plurality of nodes configured to send link status messages only to other nodes of the outer nodal area,
  wherein the adapting comprises:
   configuring the sniffer as a partition designated inner-nodal-area node of the first outer nodal area;
 adapting the sniffer to collect information from nodes of a second outer nodal area of the communications network by configuring the sniffer as a partition designated inner-nodal-area node of the second outer nodal area; and
 determining a topology of at least a portion of the communications network using the collected information, the portion of the communications network comprising the first and second outer nodal areas.

14. The computer readable storage medium of claim 13, wherein the operation further comprises:
 connecting the sniffer to a central location of the communications network.

15. The computer readable storage medium of claim 13, wherein the sniffer is a part of an existing network management system of the communications network.

16. The computer readable storage medium of claim 13, wherein the sniffer is a stand-alone device connected independently to a central location of the communications network.

17. The computer readable storage medium of claim 14, wherein the operation further comprises:
 for each remaining outer nodal area of the plurality of outer nodal areas:
  adapting the sniffer to collect information from nodes of the remaining outer nodal area by configuring the sniffer as a partition designated inner-nodal-area node of the remaining outer nodal area.

18. The computer readable storage medium of claim 17, wherein the operation further comprises:
 determining a topology of the entire communications network using the collected information from each of the plurality of outer nodal areas.

19. The computer readable storage medium of claim 13, wherein the collected information comprises link state messages sent by nodes of the first and second outer nodal areas.

20. The computer readable storage medium of claim 13, wherein said collected information is based upon an existing network protocol.

21. The computer readable storage medium of claim 20, wherein the existing network protocol is part of ISO-IEC 10589:2001.

22. The computer readable storage medium of claim 13 wherein the determining the topology further comprises:
 collecting information about the first inner nodal area;
 calculating the topology according to the first inner nodal area;
 subsequently receiving information about the second inner nodal area; and
 recalculating the topology based upon the second inner nodal area.

23. The computer readable storage medium of claim 13, wherein the determining the topology further comprises:
 receiving information from all nodes of all areas in the communications network; and
 performing a single topology calculation.

24. The computer readable storage medium of claim 13, wherein each node of the inner nodal area that connects a respective outer nodal area to the inner nodal area is a two-level node such that, at one level, the node functions as a member of the inner nodal area and, at another level, the node functions as a member of the respective outer nodal area.

25. A communications network comprising:
 an inner nodal area, comprising a plurality of nodes;
 two or more outer nodal areas connected to the inner nodal area via respective nodes of the inner nodal area, each of the two or more outer nodal areas comprising a respective plurality of nodes each of the respective plurality of nodes configured to send link status messages only to other nodes of the outer nodal area; and
 a single sniffer adapted to detect topology information about all nodes in the inner nodal area and the two or more outer nodal areas from a central location in the communications network by being configured sequentially as a partition designated inner-nodal-area node of each of the two or more outer nodal area.

26. The communications network of claim 25, wherein the single sniffer is connected to the inner nodal area.

27. The communications network of claim 25, wherein the single sniffer is a part of an existing network management system of the communications network.

28. The communications network of claim 25, wherein the single sniffer is a stand-alone device connected independently to the central location of the communications network.

29. The communications network of claim 26, wherein the single sniffer is instructed to function as a partition designated node in an existing network protocol.

30. The communications network of claim 29, wherein the existing network protocol is ISO-IEC 10589:2001.

31. A method for managing a communications network having an inner nodal area and a plurality of outer nodal areas connected to the inner nodal area via respective nodes of the inner nodal area, the method comprising:

adapting a single sniffer to collect information from nodes associated with at least two of the plurality of outer nodal areas of the communications network by configuring the sniffer, sequentially, as a partition designated inner-nodal-area node of each of the at least two outer nodal areas; and determining a topology of at least a portion of the communications network using the collected information, the portion of the communications network comprising the at least two of outer nodal areas.

32. The method of claim 31, wherein the collected information comprises link state messages sent by all nodes of the at least two outer nodal areas.

* * * * *

UNITED STATES PATENT AND TRADEMARK OFFICE
CERTIFICATE OF CORRECTION

| | | |
|---|---|---|
| PATENT NO. | : 7,646,729 B2 | |
| APPLICATION NO. | : 10/870217 | |
| DATED | : January 12, 2010 | |
| INVENTOR(S) | : Rajan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1124 days.

Signed and Sealed this

Twenty-eighth Day of December, 2010

David J. Kappos
*Director of the United States Patent and Trademark Office*